United States Patent
Hedberg et al.

(10) Patent No.: US 11,218,955 B2
(45) Date of Patent: Jan. 4, 2022

(54) METHOD OF ENABLING ACCESS TO A PLURALITY OF COMMUNICATION NETWORKS FOR A WIRELESS COMMUNICATION DEVICE

(71) Applicant: Telefonaktiebolaget LM Ericsson (publ), Stockholm (SE)

(72) Inventors: Tomas Hedberg, Nacka (SE); Patrik Teppo, Bobäck (FI); Jari Vikberg, Järna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/755,201

(22) PCT Filed: Oct. 13, 2017

(86) PCT No.: PCT/SE2017/051011
§ 371 (c)(1),
(2) Date: Apr. 10, 2020

(87) PCT Pub. No.: WO2019/074412
PCT Pub. Date: Apr. 18, 2019

(65) Prior Publication Data
US 2021/0219217 A1  Jul. 15, 2021

(51) Int. Cl.
*H04W 48/18* (2009.01)
*H04W 4/02* (2018.01)
(Continued)

(52) U.S. Cl.
CPC ............. *H04W 48/18* (2013.01); *H04W 8/18* (2013.01); *H04W 8/24* (2013.01)

(58) Field of Classification Search
None
See application file for complete search history.

(56) References Cited

U.S. PATENT DOCUMENTS

| 2010/0240370 A1 | 9/2010 | Pandit et al. |
| 2013/0143542 A1 | 6/2013 | Kovvali et al. |
| (Continued) | | |

FOREIGN PATENT DOCUMENTS

| EP | 2237610 A1 | 10/2010 |
| GB | 2422515 A | 7/2006 |
| GB | 2491869 A | 12/2012 |

*Primary Examiner* — Gary Lafontant
(74) *Attorney, Agent, or Firm* — Murphy, Bilak & Homiller, PLLC (57) ABSTRACT

The invention relates to methods and devices for enabling access to a plurality of communication networks (107-110). A wireless communication device (101) acquires (S101) information regarding network access capabilities of any modems with which the wireless communication device is equipped, as well as information identifying operator profiles available to each of said any modems, and establishes (S102) a connection with a network connectivity selection node (106) that can determine which network access is available for each of said any modems. The wireless communication device further reports (S103) the acquired network access capabilities and operator profiles of each of said any modems to the network connectivity selection node, and receives (S105), in reply to the reporting, a recommendation on which one or more of said any modems to use for connecting to one or more of the plurality of communication networks.

19 Claims, 4 Drawing Sheets

(51) Int. Cl.
*H04W 8/18* (2009.01)
*H04W 8/24* (2009.01)

(56) References Cited

U.S. PATENT DOCUMENTS

2014/0293982 A1 10/2014 Gupta
2018/0098276 A1* 4/2018 Livanos ................ H04W 4/025

* cited by examiner

METHOD OF ENABLING ACCESS TO A PLURALITY OF COMMUNICATION NETWORKS FOR A WIRELESS COMMUNICATION DEVICE

TECHNICAL FIELD

The invention relates to a method performed by a wireless communication device of enabling access to a plurality of communication networks, a wireless communication device performing the method, a method performed by a network connectivity selection node of facilitating, for a wireless communication device, access to a plurality of communication networks, and a network connectivity selection node performing the method.

BACKGROUND

The current way of providing connectivity is tightly connected to the traditional way telecom operators have provided services, for instance telephony where users are local and operators act on a geographical limited area with competition among the local operators.

Each operator also has their own separate network with spectrum, radio, core and services with some exceptions where resources are shared to share cost.

There is an increasing interest in "global connectivity" solutions, i.e. solutions which are not restricted to specific national public land mobile networks (PLMNs) alone or national PLMNs in collaboration with selected international roaming partners. Shipping and freight industries, car manufacturers, emerging Internet of Things (IoT) applications, etc., desire one global communication solution. This solution may, depending on e.g. commercial agreements, use almost any PLMN. This solution should also change from one "active PLMN" to another, e.g. when the car travels across a national border.

For example, a user accessing a packet-switched (PS) service via her mobile phone equipped with a Subscriber Identity Module (SIM) card being registered with Operator A while travelling by car in Germany will, when crossing or approaching the border of, say, France inevitably lose coverage if an attempt to access services of Operator B is made, and be disconnected from the currently ongoing PS service unless the connection can be continued with Operator A in France (or some agreement exists with Operator B).

In a more advanced example, suitable for e.g. freight applications, a wireless communication device carried by a vehicle has multiple modems and SIMs/UICCs, used simultaneously for network access. As the vehicle, for instance a car or a boat, crosses country borders, implying that a different Operator must be used for connectivity, or travels into areas within one and the same country where Operator A network performance or cost is inferior to that of Operator B, there is a need to change the network access of at least one of the modems of the wireless communication device from Operator A to Operator B. The evaluation of "better performance" is a joint optimization of Operator B characteristics such as Radio Access Technologies (RATs), frequency bands, supported features, etc., with the characteristics of the available modems.

With the emergence of the "next generation" of SIM cards proposed by Global System Mobile Association (GSMA), referred to as Embedded Universal Integrated Circuit Cards (eUICCs), there is a new possibility to load and/or enable new "SIM profiles" when needed. In contrast to traditional SIM cards, which are provisioned with an operator profile of a single mobile network operator, eUICC's are able to host multiple operator profiles and can be programmed to use a specific profile or change profile at any time without the need for physical replacement since the eUICCs can be provisioned from a remote location over the air.

Further, the European Telecommunications Standards Institute (ETSI) and GSMA are proposing a so called Integrated UICC (iUICC) also including the capability of remotely provisioning of SIM profile. The iUICC is conceptually a system-on-chip (SoC) solution in which the UICC is integrated as a separate secure processor core alongside other cores. SoC solutions would integrate a secure processor that leverages external non-volatile shared memory, using cryptographic means to protect data.

Another variant is a so called Soft SIM which also can be provisioned remotely with new operator profiles. In the case of Soft SIMs, there is no physical SIM card at all in the device, but the service of a SIM card is implemented in software.

SUMMARY

An object of the invention is to solve, or at least mitigate, one or more of these problems in the art and thus to provide an improved method of facilitating, for a wireless communication device, access to a plurality of communication networks.

In a first aspect of the invention a method performed by a wireless communication device of enabling access to a plurality of communication networks is provided. The method comprises acquiring information regarding network access capabilities of any modems with which the wireless communication device is equipped, as well as information identifying operator profiles available to each of said any modems, establishing a connection with a network connectivity selection node being capable of determining which network access is available for each of said any modems of the wireless communication device, reporting the acquired network access capabilities and operator profiles of each of said any modems to the network connectivity selection node, and receiving, in reply to the reporting, a recommendation on which one or more of said any modems to use for connecting to one or more of the plurality of communication networks.

In a second aspect of the invention, a wireless communication device configured to access a plurality of communication networks is provided. The wireless communication device comprises a processing unit and a memory, said memory containing instructions executable by said processing unit, whereby the wireless communication device is operative to acquire information regarding network access capabilities of any modems with which the wireless communication device is equipped, as well as information identifying operator profiles available to each of said any modems, establish a connection with a network connectivity selection node being capable of determining which network access is available for each of said any modems of the wireless communication device, report the acquired network access capabilities and operator profiles of each of said any modems to the network connectivity selection node, and receive, in reply to the reporting, a recommendation on which one or more of said any modems to use for connecting to one or more of the plurality of communication networks.

In a third aspect of the invention a method performed by a network connectivity selection node is provided of facilitating, for a wireless communication device, access to a plurality of communication networks. The method comprises establishing a connection with the wireless communication device, receiving information regarding network access capabilities of any modems with which the wireless communication device is equipped, as well as information identifying operator profiles available to each of said any modems, determining, from network topology and performance information and the received information regarding network access capabilities and operator profiles available to said any modems, a recommendation on which one or more of said any modems to use for connecting to one or more of the plurality of communication networks, and transmitting the recommendation to the wireless communication device.

In a fourth aspect of the invention a network connectivity selection node is provided configured to facilitate, for a wireless communication device, access to a plurality of communication networks, the network connectivity selection node comprising a processing unit and a memory, said memory containing instructions executable by said processing unit, whereby the network connectivity selection node is operative to establish a connection with the wireless communication device, receive information regarding network access capabilities of any modems with which the wireless communication device is equipped, as well as information identifying operator profiles available to each of said any modems, determining, from network topology and performance information and the received information regarding network access capabilities and operator profiles available to said any modems, a recommendation on which one or more of said any modems to use for connecting to one or more of the plurality of communication networks, and transmitting the recommendation to the wireless communication device.

In an embodiment, a wireless communication device (WCD) acquires information about the network access capabilities of each of a number of modems with which the WCD is equipped for network access, as well as information identifying operator profiles available to each of the modems, for instance a PLMN identifier even though the complete operator profile, or selected parts of the operator profile, may be reported.

After (or even before) having received the information regarding the network access capabilities and the operator profiles, the WCD establishes a connection to a network connectivity selection (NCS) node.

The NCS node logic is implemented as a network function residing "on top" of the access networks via which the WCD communicates and can determine which one of the modems should be used for connecting the WCD to an appropriate communication network, or even to a plurality of the networks.

The NCS node holds or has access to global network topology and network performance information and is typically connected to a packet data network such as the Internet. The network topology information relates to e.g. RATs and frequency bands used in different networks at different locations. It can also contain information about network capabilities and features supported in those areas. The network performance information is typically rather related to for instance QoS, latency and bandwidth capacity, i.e. information as to what level of performance the different networks have provided in the different areas.

Thereafter, the WCD reports the acquired information regarding the network access capabilities and the information identifying the operator profiles available to the modems to the NCS node over the established connection.

Upon receiving the information, the NCS node builds a policy/recommendation about which network(s) the modem (s) the WCD should be connected to, knowing the topology in the network and which possible networks to establish connections with and therefore being capable of taking an informed decision as regards the recommendation on which modem(s) and network(s) to select, by taking into account the information regarding the network access capabilities of the modems and the information identifying the operator profiles available to the modems.

Thereafter, the NCS node advantageously transmits the recommendation on which one (or more) of the modems to use for connecting to one (or more) of the plurality of communication networks.

Now, upon receiving the recommendation, the WCD may or may not choose to follow the recommendation, even though the WCD typically would. Thus, the WCD generally accesses the one or more of the plurality of communication networks in accordance with the received recommendation.

In an embodiment, the WCD receives a trigger to check for information identifying the operator profiles available to said any modems held by the WCD and for information regarding the network access capabilities of said any modems with which the wireless communication device is equipped.

In a further embodiment, the WCD receives a new operator profile to be used by the recommended one or more modems, if the recommended one or more modem lacks an adequate operator profile for connecting to one or more of the plurality of communication networks, wherein the WCD provides said one or more modems with the received adequate operator profile. The new profile may be received directly from the NCS node, or from any other node with which the NCS node communicates.

In still a further embodiment, the WCD receives an enable command for activating an operator profile available to the recommended one or more modems, if the available but inactivated operator profile already comprises an adequate operator profile for connecting to one or more of the plurality of communication networks, wherein the WCD activates the inactivated operator profile at said one or more modems. The new profile may be received directly from the NCS node, or from any other node with which the NCS node communicates.

In a fifth aspect of the invention, a computer program is provided comprising computer-executable instructions for causing a wireless communication device to perform steps recited in the method of the first aspect when the computer-executable instructions are executed on a processing unit included in the wireless communication device.

In a sixth aspect of the invention, a computer program product is provided comprising a computer readable medium, the computer readable medium having the computer program of the fifth aspect embodied thereon.

In a seventh aspect of the invention, a computer program is provided comprising computer-executable instructions for causing a network connectivity selection node to perform steps of the method of the third aspect when the computer-executable instructions are executed on a processing unit included in the network connectivity selection node.

In an eighth aspect of the invention, a computer program product is provided comprising a computer readable medium, the computer readable medium having the computer program of the seventh aspect embodied thereon.

Further embodiments will be discussed in the following.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

When requesting access to a communication network, it is essential that the wireless communication device with which the user requests the access is equipped with adequate operator profiles. Operator profile information include, i.a., international mobile subscriber identity (IMSI) number, security authentication and ciphering information, temporary information related to the local network, a list of the services the user has access to, etc. Hence, the operator profile contains operator profile information required to identify the operator with which the user subscribes as well as access credentials required to connect to the network. For a conventional SIM card, the operator profile is typically referred to as the SIM profile and is normally used in 3GPP accesses.

For non-3GPP access, such as e.g. WiFi, and cases where SIM cards are not employed, the operator profile would typically comprise access credentials in the form of certificates and associated cryptographic keys. SIM cards can also be used in non-3GPP accesses, such as e.g. WiFi, in some cases.

A variety of wireless communication devices being equipped with SIM cards or UICCs exist, such as smart phones, tablets, computers, cameras, etc. In Global System for Mobile Communications (GSM), Universal Mobile Telecommunications System (UMTS), 3GPP Long Term Evolution (LTE) and 5G New Radio (NR), these devices are referred to as Mobile Station (MS) or User Equipment (UE).

As previously has been described, in for instance freight applications, a vehicle such as a boat or a car may carry one or more wireless communication devices being equipped with multiple modems and SIMs, used simultaneously for different types of network accesses (e.g. 2G, 3G, 4G, 5G, WiFi, etc.), as well as for the same type of network access. As the vehicle crosses country borders, implying that a different operator must be used for connectivity, or travels within one and the same country into areas where Operator A network performance or cost is inferior to that of Operator B, there may be a need to change the network access of at least one of the modems of the wireless communication device from Operator A to Operator B. The evaluation of "better performance" is a joint optimization of Operator B characteristics such as RATs, frequency bands, supported network features and capabilities, Quality of Service (QoS), etc., with the capabilities of the available modems such as particular RAT(s) offered, frequency bands supported, supported modem features and capabilities, signal quality, bandwidth capacity, etc.

An eUICC (or iUICC or Soft SIM) mitigates this problem, as new operator profiles can be downloaded to the eUICC from a remote location. Hence, an eUICC already provisioned with the operator profile of Operator A can further be provisioned with the operator profile of Operator B, i.e. an operator profile containing the adequate operator profile for connecting to Operator B.

As regards modem capabilities, it may be desirable to support different scenarios, which may call for different modem capabilities in terms of data rates, as well as to allow for market differentiation in terms of low- and high-end wireless communication devices with a corresponding difference in price, or even taking into account cross-modem interference; not all modems support all capabilities.

Furthermore, a wireless communication device from an earlier release of a standard will generally not support features introduced in later versions of the standard. For example, a 3GPP Rel-8 UE will not support so called carrier aggregation as this feature was introduced first in 3GPP Rel-10. Therefore, as part of the connection setup to a mobile network, the UE indicates not only which release of standard (e.g. LTE) it supports, but also its capabilities within the release. This could also include capabilities at the feature level such as what optional functions/features are implemented in the device. It could also include capabilities at the operational level such as what Management Information Bases (MIBs) or similar are implemented on the device. Other types of features could also be envisaged.

The different wireless communication devices capabilities can be divided into Radio or Access Stratum (AS), and Core Network or Non-Access-Stratum (NAS) information. Radio Resource Control (RRC) signalling is used to carry AS capabilities from the wireless communication devices to a radio base station (referred to in LTE as an eNB) and NAS signalling is used to carry NAS capabilities from the wireless communication devices to a Mobility Management Entity (MME in LTE context). The wireless communication devices capability information is stored in the MME.

The wireless communication devices radio (or AS) capability information contains information on Radio Access Technologies (RATs) that the wireless communication devices supports (e.g. power class, frequency bands, etc).

As can be concluded, for a wireless communication device to connect to a network, an adequate operator profile is required, but so is the adequate network access capability of any modem with which the wireless communication device is equipped for connecting to one or more networks, or network access may not be possible, at least not via a preferred network access. Hence, the modem(s) needs to be capable of handling for instance adequate RAT(s), as well as being configured with correct power class, frequency bands, etc. Further, a selected network access may be sub-optimal if the network access capabilities of the modem do not match the capabilities supported by the selected network access.

Assuming for instance that a wireless communication device is equipped with a number of modems supporting different access technologies—i.e. having different network access capabilities—such as 4G, 5G and WiFi technology, it simply cannot access a 3G network.

Figure 1:
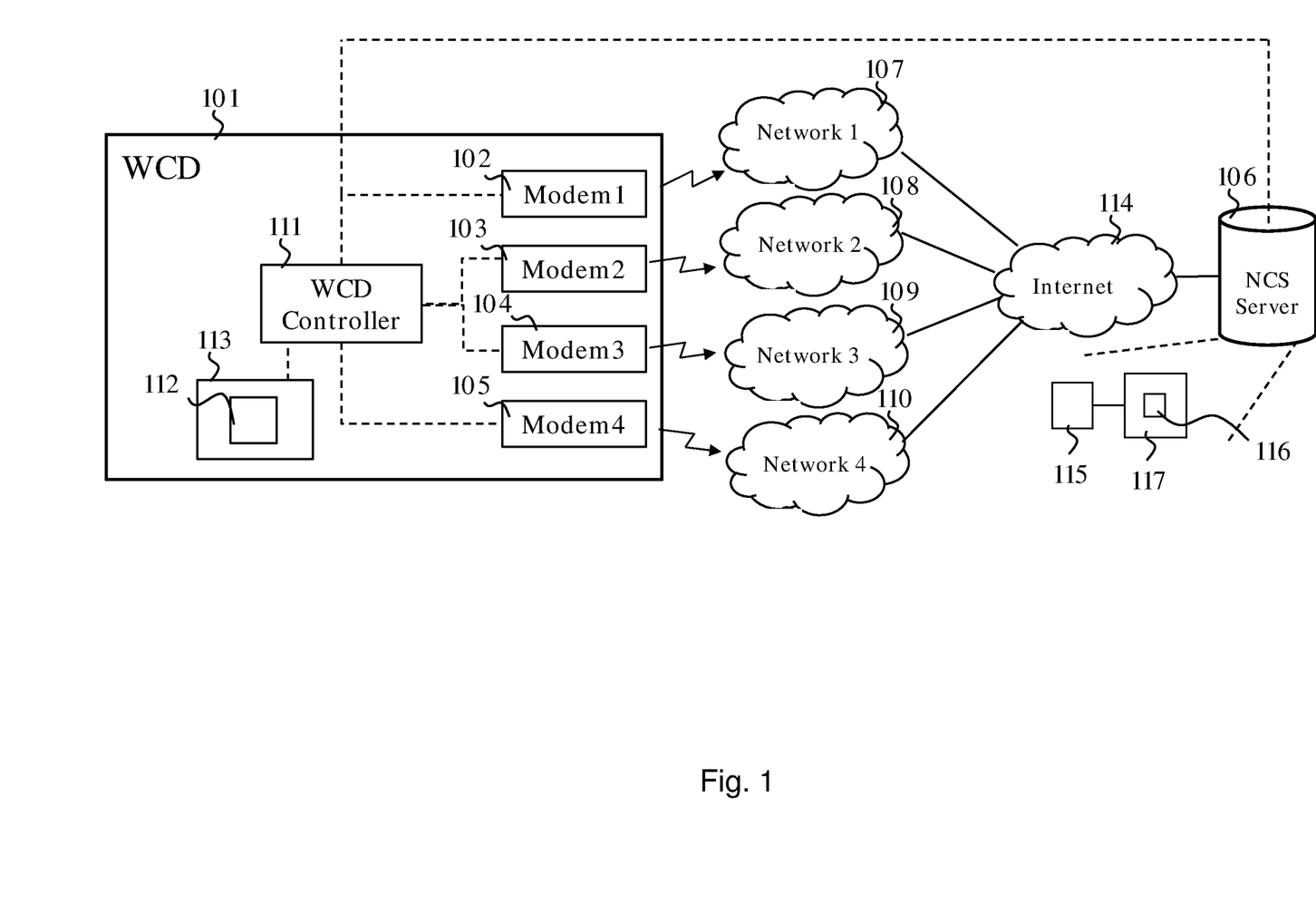
FIG. 1 illustrates a wireless communication device and a network connectivity selection server according to embodiments.

A wireless communicate device in an embodiment illustrated with reference to FIG. 1 solves these problems in that, in the context of the previous example where a car crosses or approaches a national border, a wireless communication device (WCD) 101 in the car advantageously can report operator profile available to any UE/modem 102, 103, 104, 105 included in the WCD 101, as well as the network access capabilities of each UE/modem 102-105 to a network device referred to as a network connectivity selection (NCS) node 106, in this particular example illustrated in the form of a server.

The NCS server logic is implemented as a network function residing "on top" of the different access networks 107, 108, 109, 110 and can determine which one of the modems 102-105 should be used for connecting the WCD 102 to an appropriate communication network 107-110, or even to a plurality of the networks; the WCD may for instance be connected via third modem 103 to third network 109 by means of WiFi, while also being connected to fourth network 110 via fourth modem 105 by means of 4G). Each modem 106-109 is capable of connecting the WCD 101 to one or more of the communication networks 107-110.

It may further be that two or more of the modems support the same RAT, but where a respective one of the modems are used for connecting to different access networks. For instance, first modem 102 and second modem 103 may both be capable of 3G communication, but the first modem 102 will be used for 3G communication with Operator A via first network 107 while the second modem 103 will be used for 3G communication with Operator B via second network 108.

It should further be noted that the WCD 101 at any time may request a recommendation from the NCS server 106 on which network access to select; the request is not necessarily triggered by an event such as the approaching of a national border.

The NCS server 106 holds or has access to global network topology and network performance information and is typically connected to a packet data network such as the Internet 114, for instance by accessing a local or remote database. The network topology information typically relates to RATs and frequency bands used in different networks at different locations. It can also contain information about network capabilities and features supported in those areas. The network performance information is typically rather related to QoS, latency, bandwidth capacity, i.e. information as to what level of performance the different networks have provided in the different areas. The NCS server can communicate this information to the WCD in order to facilitate communication over any of the networks, e.g. which frequency bands to scan in order to initially attach to a particular network.

As is understood, the steps of the method performed by the WCD 101 of enabling access to a plurality of communication networks according to embodiments are in practice performed by a WCD controller in, i.e. a processing unit embodied in the form of one or more microprocessors arranged to execute a computer program 112 downloaded to a suitable storage volatile medium 113 associated with the microprocessor, such as a Random Access Memory (RAM), or a non-volatile storage medium such as a Flash memory or a hard disk drive. The processing unit 111 is arranged to cause the WCD 101 to carry out the method according to embodiments when the appropriate computer program 112 comprising computer-executable instructions is downloaded to the storage medium 113 and executed by the processing unit in. The storage medium 113 may also be a computer program product comprising the computer program 112. Alternatively, the computer program 112 may be transferred to the storage medium 113 by means of a suitable computer program product, such as a Digital Versatile Disc (DVD) or a memory stick. As a further alternative, the computer program 112 may be downloaded to the storage medium 113 over a network. The processing unit 111 may alternatively be embodied in the form of a digital signal processor (DSP), an application specific integrated circuit (ASIC), a field-programmable gate array (FPGA), a complex programmable logic device (CPLD), etc.

Correspondingly, the NCS server 106 comprises a processing unit 115 embodied in the form of one or more microprocessors arranged to execute a computer program 116 downloaded to a suitable storage volatile medium 117 associated with the microprocessor for performing a method of facilitating, for a wireless communication device, access to a plurality of communication networks.

Figure 2:
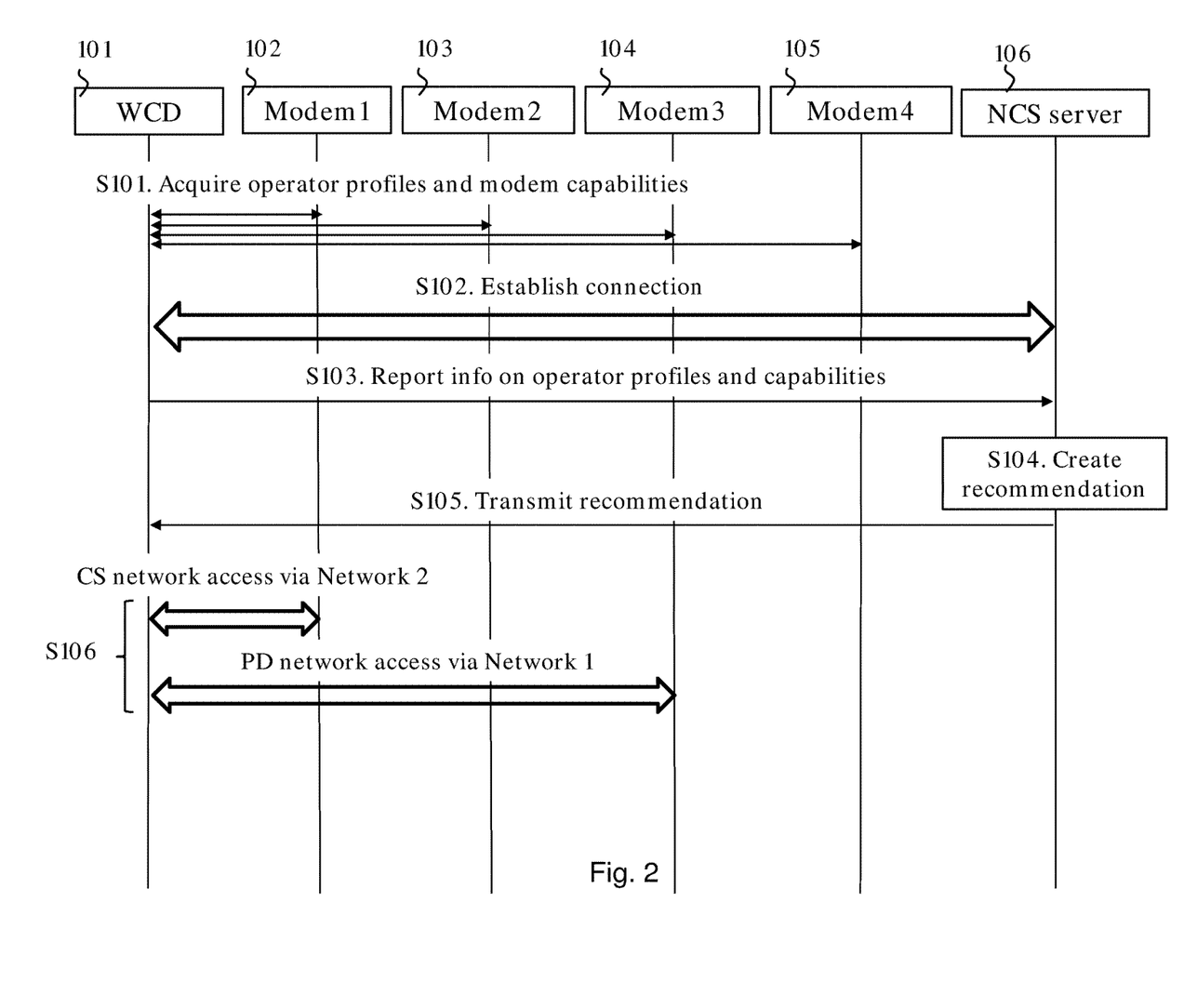
FIG. 2 shows a signalling diagram illustrating a method of enabling access to a plurality of communication networks for a wireless communication device according to an embodiment.

FIG. 2 shows a flowchart illustrating an exemplifying embodiment where the WCD 101 will be advised by the NCS server 106 on which modem(s) 102-105 to select for connecting to one or more of the plurality of networks 107-110. For instance, the WCD 101 may reside in a car travelling through a rural area of a country where it may be important to select a best-performance access in order to set up communication with an operator at all.

In step S101 the WCD 101 acquires, via the WCD controller 111, information about the network access capabilities of each of the modems 102-105 with which the WCD 101 is equipped, as well as information identifying the operator profiles available to each of the modems 102-105, for instance a PLMN identifier even though the complete operator profile, or selected parts of the operator profile, may be reported. For instance, the WCD controller 111 turns to the UICC of each modem (or possibly to a UICC common for the modems) and acquires the operator profile identifiers, or alternatively the complete operator profiles, or selected parts of the operator profile, available to each modem.

After (or even before) having received the information regarding the network access capabilities and the operator profiles, the WCD 101 establishes a connection to the NCS server 106. In this particular example, the connection is established in step S102 after the acquiring of modem capabilities and profiles has been performed.

It is noted that in this particular exemplifying embodiment, the WCD 101 is not subjected to any trigger for acquiring the information, but may in fact perform this action occasionally in order to receive a "best option" recommendation from the NCS server 106.

In step S103, the WCD 101 reports the acquired information regarding the network access capabilities of the modems and the information identifying the operator profiles available to the modems 102-105 to the NCS server 106 over the established connection.

Upon receiving the information, the NCS server 106 builds a policy/recommendation about which network(s) the modem(s) the WCD 101 should be connected to in step S104, knowing the topology in the network and which possible networks to establish connections with and therefore being capable of taking an informed decision as regards the recommendation on which modem(s) and network(s) to select, by taking into account the information regarding the network access capabilities of the modems 102-105 and the information identifying the operator profiles available to the modems 102-105.

Thereafter, in step S105, the NCS server 106 transmits the recommendation on which one (or more) of the modems 102-105 to use for connecting to one (or more) of the plurality of communication networks 107-110.

Now, upon receiving the recommendation, the WCD 101 may or may not choose to follow the recommendation. However, in this particular example, the WCD 101 follows the recommendation in step S106.

As an example, the recommendation could be to select the first modem 102 for performing a circuit-switched (CS) telephone call via the second network 108 (being e.g. a 3G network), the first modem 102 being best suited for performing circuit-switched operations, while the third modem 104 (being better suited for data traffic) is recommended for packet-data (PD) type transfers via the first network 107 (being e.g. a 4G network).

In an alternative example, the WCD 101 is connected to a packet-switched (PS) domain via two different networks, for instance via the first modem 102 to the second network 108 and the third modem 104 to the third network 109. The two packet-data connections can then be used in different ways; in a first scenario example one network is actively used while the other is standby (for the case that the first network performance changes). In a second scenario, both networks are used simultaneously for so called traffic aggregation.

Advantageously, the NCS server 106 with its network topology knowledge provides a recommendation pertaining to the network access to be selected to the WCD 101 by taking into account reported operator profiles and network access capabilities, in order to provide a recommendation best suited for the WCD 101.

As previously was mentioned, cross-modem interference may be taken in to account upon providing a recommendation. In an embodiment, in case the WCD includes more than one modem, the NCS server 106 may also build the policy/recommendation by considering all modems jointly to avoid or minimize interference between the modems, i.e. to minimize cross-modem interference. This can be used to achieve optimal performance for the WCD as a whole, since poor frequency band combinations for the modems may increase interference between the modems and thus reduce performance or disable simultaneous operation. Independent scheduler and Radio Resource Management (RRM) logic per access/modem can somewhat mitigate inter-modem interference.

In addition, NCS server guidance of favorable operator (band/carrier) combinations will improve chances of achieving low interference, by controlling the modem side. The NCS server 106 may build the policy/recommendation based on information about different frequency bands and carriers used in different communications networks in a specific area. Based on this knowledge, the NCS server 106 can select different communication networks for the modems such that likelihood for cross-modem interference is minimized. In one example, the WCD contains two modems. In this example the NCS server 106 builds the policy/recommendation based on the combined performance of both modems by building the policy/recommendation in a way that the two modems will not experience cross-modem interference.

Figure 3:
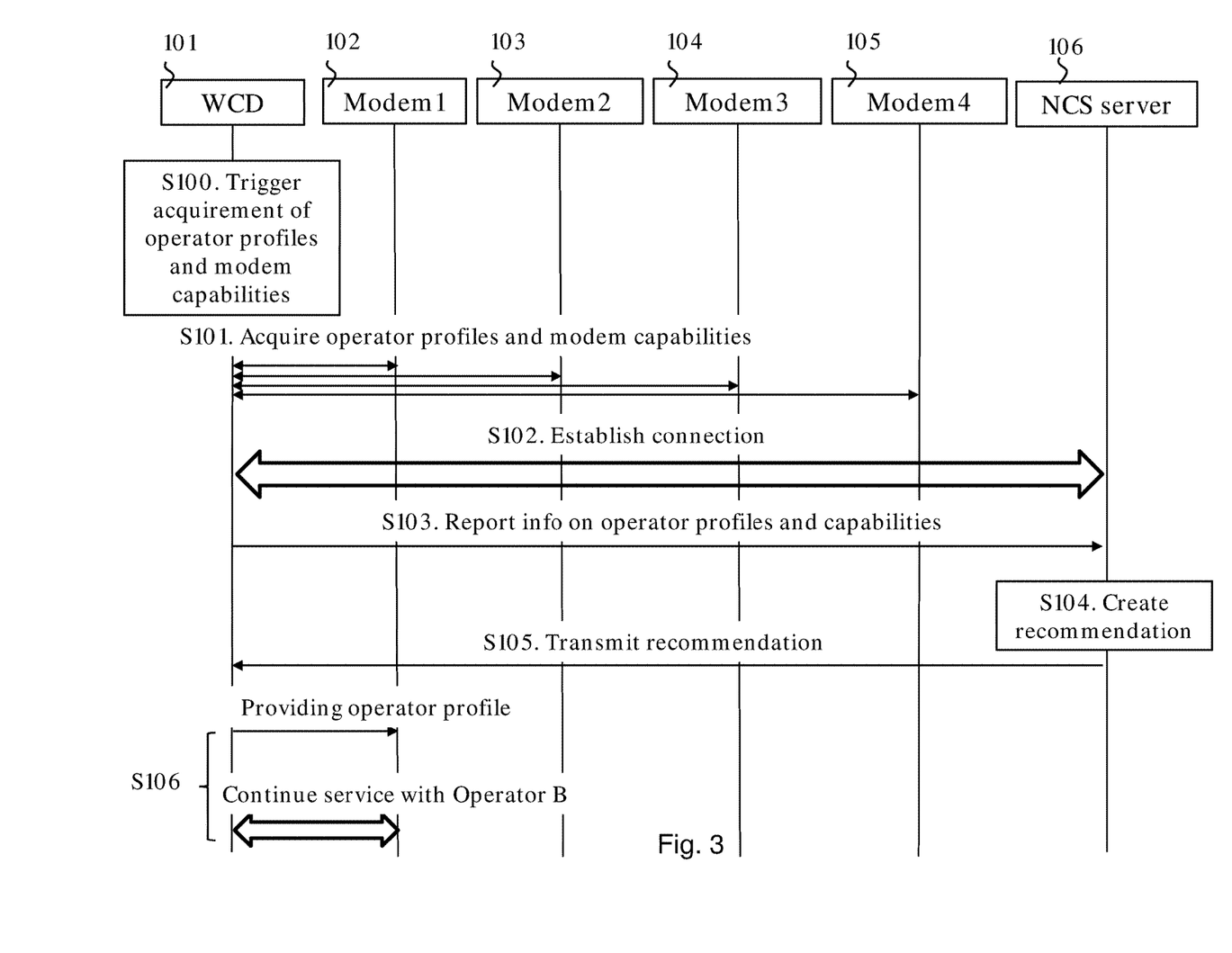
FIG. 3 shows a signalling diagram illustrating a method of enabling access to a plurality of communication networks for a wireless communication device according to another embodiment.

FIG. 3 shows a flowchart illustrating an exemplifying embodiment where in line with a previously discussed scenario where the access of the WCD 101 needs to be transferred from Operator A to Operator B in order to avoid being disconnected from the currently rendered service as provided by Operator A.

As an example, a user travelling by car in Germany is accessing a PS service via her mobile phone (i.e. the WCD 101) equipped with the first modem 102 being configured with an eUICC registered with Operator A. Now, as the car approaches the border of France, coverage will inevitably be lost if an attempt to establish the ongoing connection with Operator B is made, unless the eUICC of the first modem 102 holds the operator profile of Operator B (assuming that Operator A cannot provide its own network access in the current area and/or does not have an agreement with Operator B).

In a first step S100, the WCD 101 receives a trigger to check for operator profiles available to the modems 102-105 as well as the network access capabilities of the modems. For instance, the WCD controller 111 turns to the UICC of each modem (or possibly to a UICC common for the modems) and acquires the operator profiles of each modem, or at least an operator identifier, such as the previously mentioned PLMN identifier.

In this particular exemplifying embodiment, GPS information to which the WCD 101 has access indicates that the car in which the WCD 101 is arranged approaches France from Germany, thereby triggering the WCD 101 to collect the operator profiles. Alternatively, the NCS server 106 may trigger the WCD to acquire the operator profiles.

The WCD 101 will then in step S101, via the WCD controller 111, acquire information about the network access capabilities of each of the modems 102-105 with which the WCD 101 is equipped, as well as information identifying the operator profiles available to each of the modems 102-105.

After (or even before) having received the information regarding the network access capabilities and the operator profiles of the modems, the WCD 101 establishes a connection. In this particular example, the connection is established in step S102 after the acquiring of modem capabilities and operator profiles available to the modems has been performed.

In step S103, the WCD 101 reports the acquired information regarding the network access capabilities of the modems and the operator profiles available to the modems 102-105 to the NCS server 106 over the established connection.

Upon receiving the information, the NCS server 106 builds a policy/recommendation about which network(s) the modem(s) in the WCD 101 should be connected to in step S104, knowing the topology in the network and which possible networks to establish connections with and therefore being capable of taking an informed decision as regards the recommendation on which modem(s) and network(s) to select, by taking into account the information regarding the network access capabilities and the operator profiles of the modems 102-105.

In this particular example, the NCS server 106 concludes that none of the modems has access to the operator profile of Operator B, being the operator in France with which the ongoing PS connection is to be continued.

Thereafter, in step S105, the NCS server 106 transmits the recommendation that the first modem 102 should be used for connection with Operator B via the second network 108 (i.e. a network operated by Operator B), and also provides the WCD 101 with the operator profile of Operator B such that the eUICC of the first modem 102 can be provided with the adequate operator profile. It is noted that the NCS server 106 may send the new operator profile directly to the WCD 101, but it can also be envisaged that the NCS server 106 triggers another node/server to perform the actual transmission of the new operator profile.

Thus, the WCD controller 111 provides the eUICC of the first modem 102 with the received adequate profile in step S106, i.e. the operator profile of Operator B, and the ongoing PS connection is thus continued in the second network 102 operated by Operator B via the first modem 102.

Advantageously, there is no need to re-establish a terminated connection, but a smooth transfer of the ongoing PS access from Operator A to Operator B is provided.

Again with reference to FIG. 3, in an alternative embodiment, the WCD 101 may in step S103 report that the operator profile of Operator B indeed is available to the eUICC of the first modem 102. If so, the NCS server 106 transmits in step S105 an enable command for activating the operator profile of Operator B, which already is accessible. Consequently, the WCD controller 111 activates the operator profile of Operator B, which is present in the eUICC of the first modem 102. Alternatively, the NCS server 106 triggers another node/server to transmit the enable command to the WCD 101.

Figure 4:
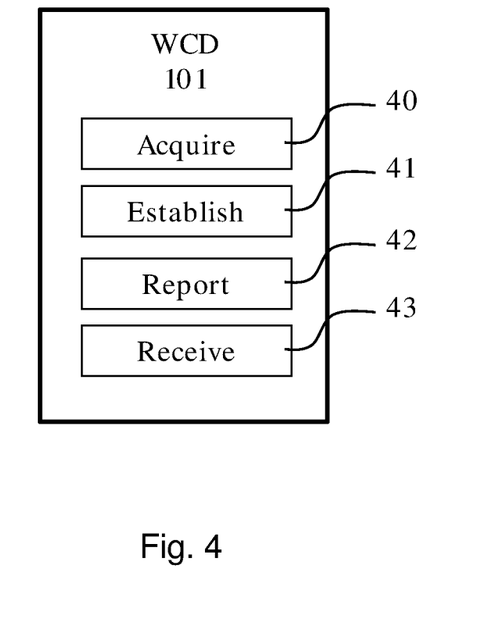
FIG. 4 illustrates a wireless communication device according to an embodiment.

FIG. 4 illustrates a WCD 101 configured to access a plurality of communication networks. The WCD 101 comprises acquiring means 40 adapted to acquire information regarding network access capabilities of any modems with which the wireless communication device is equipped, as well as information identifying operator profiles available to each of said any modems, establishing means 41 adapted to establish a connection with a network connectivity selection node being capable of determining which network access is available for each of said any modems of the wireless communication device, reporting means 42 adapted to report the acquired network access capabilities and operator profiles of each of said any modems to the network connectivity selection node, and receiving means 43 adapted to receive, in reply to the reporting, a recommendation on which one or more of said any modems to use for connecting to one or more of the plurality of communication networks.

The means 40-43 may comprise a communications interface for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

Figure 5:
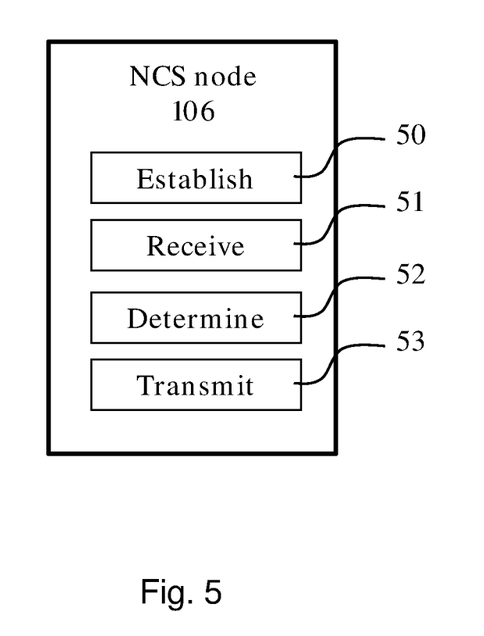
FIG. 5 illustrates a network connectivity selection node according to an embodiment.

FIG. 5 illustrates an NCS node 106 configured to facilitate, for a wireless communication device, access to a plurality of communication networks. The NCS node 106 comprises establishing means 50 adapted to establish a connection with the wireless communication device, receiving means 51 adapted to receive information regarding network access capabilities and information identifying operator profiles available to any modems with which the wireless communication device is equipped, determining means 52 adapted to determine, from network topology and performance information and the received information regarding network access capabilities and operator profiles available to said any modems, a recommendation on which one or more of said any modems to use for connecting to one or more of the plurality of communication networks, and transmitting means 53 adapted to transmit the recommendation to the wireless communication device.

The means 50-53 may comprise a communications interface for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed by a wireless communication device that is equipped with two or more modems for accessing mobile networks, the method comprising:
    carrying on communications using a particular one of the modems and using a particular operator profile;
    sending a report to a network connectivity selection node, the report indicating network access capabilities of each modem and operator profiles available in each modem, each operator profile corresponding to a respective mobile network operator;
    receiving a recommendation from the network connectivity selection node, the recommendation indicating a recommended modem and a recommended operator profile, to be used by the wireless communication device for continuing the communications with respect to the wireless communication device transitioning between coverage areas associated with different mobile network operators; and
    changing at least one of the particular modem and the particular operator profile used for the communications, in dependence on the recommendation.

2. The method of claim 1, further comprising accessing a communication network using the recommended modem and the recommended operator profile.

3. The method of claim 1, wherein the recommended operator profile is not available in the recommended modem, and wherein the method further comprises: receiving the recommended operator profile as a new operator profile from the network connectivity selection node or another remote node.

4. The method of claim 1, wherein the recommended operator profile is available in the recommended modem but is inactive, and wherein the method further comprises: activating the recommended operator profile in response to receiving an enable command from the network connectivity selection node or another remote node.

5. The method of claim 1, wherein sending the report to the network connectivity selection node comprises sending the report responsive to:
    receiving a trigger to check from the network connectivity selection node or another remote node.

6. The method according to claim 1, the network access capabilities comprising one or more of supported Radio Access Technologies (RATs), frequency bands, network features of the modem, Quality of Service (QoS), bandwidth capacity, signal quality, cross-modem interference, latency, Access Stratum (AS), information of the wireless communication device, and Non-Access-Stratum (NAS), information of the wireless communication device.

7. A method performed by a network connectivity selection node, the method comprising:
- receiving a report from a wireless communication device that is equipped with two or more modems for accessing mobile networks, the report indicating network access capabilities of each modem and operator profiles available in each modem, each operator profile corresponding to a respective mobile network operator;
- determining a recommendation for the wireless communication device, the recommendation indicating a recommended modem and a recommended operator profile to be used by the wireless communication device for continuing communications with respect to the wireless communication device transitioning between coverage areas associated with different mobile network operators, wherein the recommendation is determined based on the report and network performance and topology information associated with the coverage areas; and
- sending the recommendation to the wireless communication device, or sending the recommendation to another node, for sending to the wireless communication device.

8. The method of claim 7, further comprising sending or initiating the sending of a new operator profile as the recommended operator profile, responsive to determining that the recommended operator profile is not available in the recommended modem.

9. The method of claim 7, further comprising sending or initiating the sending of an enable command enabling the activation of the recommended operator profile in the recommended modem, responsive to determining that the recommended operator profile is available but not active in the recommended modem.

10. The method of claim 7, further comprising sending or initiating the sending of a trigger to the wireless communication device to trigger the wireless communication device to send the report.

11. A wireless communication device comprising a processing unit and a memory and equipped with two or more modems for accessing mobile networks, said memory containing instructions executable by said processing unit, whereby the wireless communication device is operative to:
- carry on communications using a particular one of the modems and using a particular operator profile;
- send a report to a network connectivity selection node, the report indicating network access capabilities of each modem and operator profiles available in each modem, each operator profile corresponding to a respective mobile network operator;
- receive a recommendation from the network connectivity selection node, the recommendation indicating a recommended modem and a recommended operator profile, to be used by the wireless communication device for continuing the communications with respect to the wireless communication device transitioning between coverage areas associated with different mobile network operators; and
- change at least one of the particular modem and the particular operator profile used for the communications, in dependence on the recommendation.

12. The wireless communication device of claim 11, further being operative to access a communication network using the recommended modem and the recommend operator profile.

13. The wireless communication device of claim 11, wherein the recommended operator profile is not available in the recommended modem and the wireless communication device is further operative to receive a new operator profile to be used as the recommended operator profile.

14. The wireless communication device of claim 11, wherein the recommended operator profile is available in the recommended modem but is inactivated, and wherein the wireless communication device is further operative to activate the recommended operator profile in response to receiving an enable command.

15. The wireless communication device of claim 11, further being operative to send the report in response to a trigger.

16. A network connectivity selection node comprising a processing unit and a memory, said memory containing instructions executable by said processing unit, whereby the network connectivity selection node is operative to:
- receive a report from a wireless communication device equipped with two or more modems for accessing mobile networks, the report indicating network access capabilities of each modem and operator profiles available in each modem, each operator profile corresponding to a respective mobile network operator;
- determine a recommendation for the wireless communication device, the recommendation indicating a recommended modem and a recommended operator profile to be used by the wireless communication device for continuing communications with respect to the wireless communication device transitioning between coverage areas associated with different mobile network operators, wherein the recommendation is determined based on the report and network performance and topology information associated with the coverage areas; and
- send the recommendation to the wireless communication device, or to another node for sending to the wireless communication device.

17. The network connectivity selection node of claim 16, the network connectivity selection node further being operative to send or initiate the sending of a new operator profile as the recommended operator profile, in response to determining that the recommended operator profile is not available in the recommended modem.

18. The network connectivity selection node of claim 16, the network connectivity selection node further being operative to send or initiate the sending of an enable command enabling the activation of the recommended operator profile in the recommended modem, in response to determining that the recommended operator profile is available in the recommended modem but inactivated.

19. The network connectivity selection node of claim 16, further being operative to transmit a trigger to the wireless communication device to trigger the wireless communication device to send the report.

* * * * *